A. V. T. DAY.
TRAFFIC CONTROLLING SYSTEM FOR RAILWAYS.
APPLICATION FILED OCT. 29, 1908.
1,119,249. Patented Dec. 1, 1914.
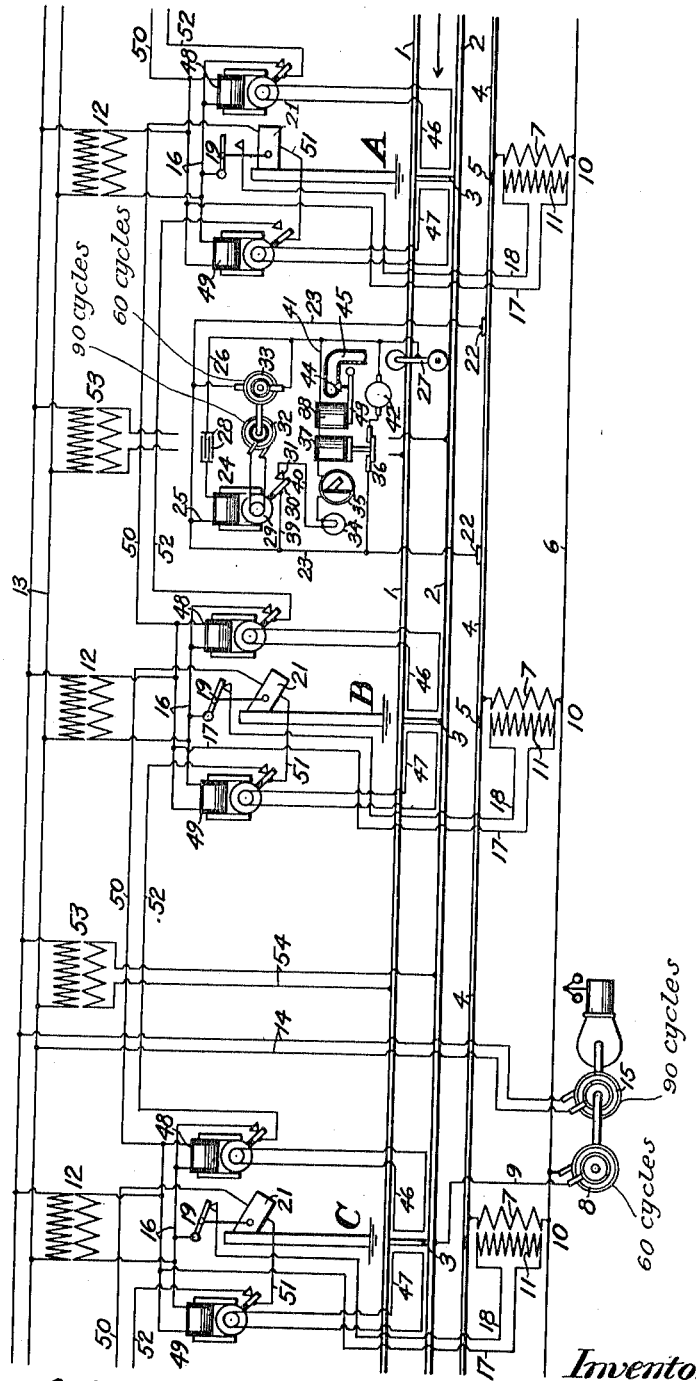
Witnesses
Wm. Ashley Kelly
Bernard Cowen
Inventor
Albert V. T. Day
By Henry D. Williams
Attorney.

UNITED STATES PATENT OFFICE.

ALBERT V. T. DAY, OF NEW ROCHELLE, NEW YORK, ASSIGNOR TO THE HALL SWITCH AND SIGNAL COMPANY, A CORPORATION OF MAINE.

TRAFFIC-CONTROLLING SYSTEM FOR RAILWAYS.

1,119,249.          Specification of Letters Patent.          Patented Dec. 1, 1914.

Application filed October 29, 1908. Serial No. 460,124.

*To all whom it may concern:*

Be it known that I, ALBERT V. T. DAY, a citizen of the United States, residing at New Rochelle, in the county of Westchester and State of New York, have invented a certain new and useful Improvement in Traffic-Controlling Systems for Railways, of which the following is a specification, reference being had therein to the accompanying drawings, forming part thereof.

My invention relates to improvements in electric traffic-controlling systems for railways, particularly to systems in which traffic-controlling devices carried by a train or vehicles on a railway are responsive to and controlled by electric currents from sources external to the train or vehicle.

One object of my invention is to provide a system of the kind above referred to with novel and simple means for maintaining electrical communication between the stationary parts of the apparatus and the electrically controlled devices carried by the train or vehicle. For this purpose, I utilize, in the present system, the trolley wire, contact rail, or other conductor of traction current, by transmitting through this conductor and through the contact devices carried by the train or vehicle, a current or currents differing in character from the traction current, while the traffic-controlling devices on the train or vehicle are arranged and constructed to be unaffected by the traction current flowing through the same conductor. More specifically, I use, in the illustrated embodiment of my invention, alternating currents for traction and for controlling the traffic-controlling devices, which are differentiated from each other by being of substantially different frequency.

In connection with the traffic-controlling devices carried by the train or vehicle I use, preferably, but not necessarily, stationary traffic-controlling devices, such as track signals, and coördinate to a certain extent, the electric controlling devices by which the stationary traffic-controlling devices and the moving traffic-controlling devices are governed.

Other objects and features of my invention, relating more particularly to specific features of construction and operation of the preferred embodiment thereof, will be noted in connection with the description of the illustrated embodiment of the invention.

I will now describe the embodiment of my invention illustrated in the accompanying drawing, and will thereafter point out my invention in claim.

The drawing is a diagram of a portion of an electric traffic-controlling system embodying the present invention, and it represents two complete blocks, and portions of two adjacent blocks, on the west-bound track of a double-track railway, together with a train or vehicle in one of the blocks.

The three signal stations illustrated are designated, respectively, by the letters A, B and C. As the apparatus at the several stations is precisely similar, similar reference numbers are applied to corresponding parts, but in the following description these numbers are followed, where necessary, by the letter A, B or C to indicate the station at which the part in question is located.

The track rails 1 and 2 are bonded, or otherwise rendered continuously conductive, so that they may be utilized as conductors of traction current, and they are also connected at the ends of the blocks by heavy cross-bonds 3 of negligible impedance.

A traction-current conductor 4, which may be a trolley wire or a contact rail or any other suitable form of conductor, is located parallel with the track to furnish trains thereon with traction current. This current is fed to the traction circuit at any convenient point by an alternating-current generator 8, of which one terminal is connected with the track rails through a wire 9.

The generator is not connected directly with the traction contact conductor 4, but the latter is fed at intervals from a feed wire 6 connected with the generator 8. The traction conductor 4 is divided at the ends of the blocks by insulated joints 5, so that it comprises a succession of electrically independent sections. Each of these sections is fed through a conductor 7 connecting it with the feed wire 6, and the conductors 7 constitute the secondary windings of transformers 10 by which the currents for controlling the traffic-controlling devices carried by the trains or vehicles are superimposed on the traction current.

The primary windings 11 of the transformers 10 are energized by transformers 12, which are connected with transmission line wires 13, through which the transformers 12 are supplied with alternating current from a generator 15 connected with the transmission wires through wires 14. This generator is constructed and operated to generate current of substantially different frequency from that of the traction current, but, for a reason which will appear later, the two currents have a definite relation, which is secured by connecting the generators mechanically and actuating them in unison, as indicated in the diagram.

The electrification of each section of the traction conductor with traffic-controlling current depends upon the clear condition of the block in advance of such section, and as a convenient means for securing this result the connections between the transformers 12 and the transformers 10 are controlled by track signals which operate automatically under the control of track circuits in the usual manner. Each transformer 12 is connected at its secondary terminals with feed wires 16, and one of the feed wires is connected through a wire 17 with a primary terminal of the corresponding transformer 10. The other primary terminal of the transformer 10 is connected by a wire 18 with a fixed contact coöperating with a circuit-breaker 19 connected with the other feed wire. The circuit-breaker is mechanically connected with and actuated by the semaphore track signal 21. The signal is normally in clear position, as shown at B and C, and the circuit-breaker 19 then engages its fixed contact, so that the transformer 10 is energized and energizes the corresponding section of the traction conductor 4 with traffic-controlling current. When the signal 21 rises to danger position the circuit-breaker 19 is thereby raised so as to break the circuit through the transformer 10 and deënergize the traction conductor, as far as traffic-controlling current is concerned, in the block to the rear of that controlled by the signal 21. The currents induced in the secondaries 7 flow through the generator 8 so that as regards currents of this frequency the generator 8 acts merely as a conductor, and the secondaries 7 act as conductors for the currents generated by the generator 8.

The traffic-controlling devices carried by a train or vehicle and responsive to traffic-controlling currents in the traction conductor are illustrated diagrammatically in the block A—B. Contact shoes 22 carried by the train or vehicle engage the traction conductor 4, and transmit both traction current and traffic-controlling current to the train apparatus through a wire 23. The traffic-controlling devices are controlled by electric translating means comprising a relay 24. This relay is of the polarized alternating-current type, and it has a field which is energized with the alternating traffic-controlling current from the traction conductor. For this purpose the field is connected through a wire 25 with the wire 23, and through a wire 26 with an axle 27 of the train, so that the relay field is included in the traction-current circuit. In order to prevent any substantial flow of traction current in the relay field a condenser 28 is interposed in the wire 26, this condenser being tuned in resonance with the traffic-controlling current but not with the traction current.

The train relay has an armature 29 which is pivotally mounted in the field and actuates a contact finger 30, coöperating with a fixed contact 31. The armature is provided with a coil or winding which is constantly energized with current of the same frequency as the traffic-controlling current induced in the transformers 10 and of definite phase relation therewith. For this purpose the armature coil is connected with a generator 32, which is driven by a motor 33. This motor is energized by traction current from the wire 23, and is a motor of the synchronous type. Since the traction generator 8 and the generator 15, which determines the frequency and phase of the traffic-controlling currents, are coupled together, as hereinbefore described, the train generator 32 is operated by the use of the synchronous motor in exact phase relation with the generator 15, and consequently it energizes the armature of the train relay 24 with current of the same frequency as and of definite phase relation with the traffic-controlling current by which the relay field is energized. Under these circumstances the armature 29 tends to rotate in a direction to maintain its contact finger 30 in engagement with the fixed contact 31.

The traffic-controlling devices carried by the train may be of various kinds, and I have shown several, including both visual signals and automatic train-stopping devices. The visual signals comprise an electric lamp 34 and a miniature semaphore indicator 35. The automatic stopping devices comprise a circuit-breaker 36 by which the traction motor is thrown out of operation, and a device for applying the air brakes. The circuit-breaker 36 is normally held closed by a magnet 37. The brake-applying device comprises a magnet 38 controlling an armature 43. The armature is normally raised and it holds closed a valve 44 which controls an escape opening in an air pipe 45 connected with the train pipe of the air-brake system. When the magnet 38 is deenergized, the valve 44 opens, the air escapes, and the brakes are applied in the well known manner.

The lamp 34, indicator 35, magnet 37 and magnet 38 are all connected in series in a circuit controlled by the relay. This circuit is energized, when normally closed, by traction current, and it passes from the wire 23 through a wire 39 to the contact finger 30 of the relay, from the fixed contact 31 through a wire 40 to the traffic-controlling devices, and from the latter through a wire 41 to the wire 26 and the axle 27. The lamp and the indicator thus normally indicate a clear track ahead, while the stopping devices are inoperative, but if through any cause the traction conductor in the block occupied by the train ceases to be energized with current from the corresponding transformer 10, the field of the train relay is deënergized, the armature rotates permitting the contact finger to fall, the lamp 34 is extinguished, the indicator 35 goes to danger position, the circuit-breaker 36 shuts off the current from the traction motor 42, and the air brakes are applied.

Since the train is always, under normal conditions, supplied with traction current, the motor 33, once started, operates indefinitely, and for this reason it need not necessarily be of the self-starting type, but any of the well known self-starting appliances may be used if desired.

It will be obvious that the transformers 10 need not be operated by any particular system of track signals, nor, indeed, by any track signals at all, but I have shown the devices constituting the particular subject matter of my invention as operating in connection with a simple system of home signals arranged in accordance with the invention disclosed in the application of Clyde J. Coleman, filed July 12, 1907, Serial No. 383,366 to which reference is made herein by permission. In this system the track rails and the cross-bonds 3 constitute track circuits in each block. Each track circuit is energized at or near the middle of the block by a transformer 53 of which the secondary terminals are connected, respectively, with the track rails through wires 54. In this arrangement the track circuit has two branches, and the current flows from the middle of the block through one rail in opposite directions to the ends of the block, then across through the cross-bonds 3 to the other rail, and back therein to the middle of the block.

The track circuits control the signals through relays energized by track coils 46 and 47, which are placed close to and in inductive relation with the track rails near the ends of the blocks. The signal relays 48 and 49 are of the same type and construction as the train relay 24, and their armature coils are connected with the track coils 46 and 47 respectively. The fields of the signal relays are connected with the feed wires 16 so as to be energized by current from the transformers 12. The contact fingers of the signal relays in each block control a line circuit by which the signals 21 at the entrance to the block is controlled. This circuit is energized by the transformer 12. Referring, for example, to the block B—C, the line circuit passes from the upper feed wire 16$^c$ through the line wire 50 to the signal 21$^B$, thence through a wire 51 to the contact finger and its fixed contact of the signal relay 49$^B$, thence through the line wire 52 to the contact finger and fixed contact of the signal relay 48$^c$, and thence to the other feed wire 16$^c$.

The signal 21 has a bias to danger position, but is provided with electrically controlled mechanism for clearing it. This mechanism may be of any ordinary or suitable form and is not illustrated in the drawings. As the signal relays are normally energized, the line circuits are normally closed, and the signals are held clear by their actuating mechanism, as illustrated at B and C.

When a train or any rolling stock occupies a block, the wheels and axles act to short-circuit one branch or both branches of the track circuit, so that one or both of the track coils and the corresponding relays are deënergized. The line circuit is thus opened and the signal at the entrance to the block is deënergized and goes to danger position. This condition is illustrated in the block A—B, where the right-hand branch of the track circuit is short-circuited through the axle 27. The track coil 47$^A$ and the armature of the relay 49$^A$ are deënergized, and the line circuit through the signal 21$^A$ is opened by the relay 49, so that the signal rises to danger position. In so moving the signal actuates the circuit-breaker 19$^A$, thereby throwing the transformer 10$^A$ out of operation, and thus any train now approaching A will be stopped, not only by the track signal 21$^A$ but also by the traffic-controlling devices carried by the train.

Various modifications may be made in the embodiment of my invention hereinbefore described and illustrated in the accompanying drawings, within the nature of the invention and the scope of the following claim.

I claim:

An electric traffic-controlling system comprising a traction circuit, a transformer having its secondary included in the traction circuit, signals along the trackway, a source of alternating current arranged to energize said track signals and also the primary winding of the said transformer, a car having its traction apparatus included in said traction circuit, and traffic-controlling means on the car responsive to current from the said transformer.

In testimony whereof I have affixed my signature in presence of two witnesses.

ALBERT V. T. DAY.

Witnesses:
　HENRY D. WILLLIAMS,
　BERNARD COWEN.